United States Patent
Wolters et al.

(10) Patent No.: US 7,133,502 B2
(45) Date of Patent: Nov. 7, 2006

(54) SYSTEM FOR AND METHOD FOR DISPATCHING SERVICE MESSAGES OVER A MULTICAST NETWORK

(75) Inventors: Hans J. Wolters, Mountain View, CA (US); Marc McEachern, Tokyo (JP)

(73) Assignee: Hewlett-Packard Development Company, LP., Houston, TX (US)

( * ) Notice: Subject to any disclaimer, the term of this patent is extended or adjusted under 35 U.S.C. 154(b) by 584 days.

(21) Appl. No.: 10/061,467

(22) Filed: Jan. 31, 2002

(65) Prior Publication Data

US 2003/0143982 A1    Jul. 31, 2003

(51) Int. Cl.
*H04M 1/64* (2006.01)
(52) U.S. Cl. .................. 379/88.11; 455/414.1
(58) Field of Classification Search ............. 455/414.1; 379/88.13, 88.17, 101.01, 201.01; 705/14
See application file for complete search history.

(56) References Cited

U.S. PATENT DOCUMENTS

| 5,848,396 | A | 12/1998 | Gerace |
| 5,887,252 | A | 3/1999 | Noneman .................. 455/414 |
| 6,044,403 | A | 3/2000 | Gerszberg et al. |
| 6,104,709 | A | 8/2000 | Rinchiuso et al. .......... 370/335 |
| 2001/0036224 | A1 | 11/2001 | Demello et al. |
| 2002/0184086 | A1* | 12/2002 | Linde .......................... 705/14 |

FOREIGN PATENT DOCUMENTS

| WO | WO9741654 | 11/1997 |
| WO | WO0176120 | 10/2001 |

OTHER PUBLICATIONS

"What is I-mode?" [on-line][retrieved on Jan. 31, 2002] Retrieved from:http://www.nttdocomo.com/html/imode01_1.html (pp. 1-2).
"Introduction to IP Multicast Routing" [on-line] [retrieved on Jan. 31, 2002] Retrieved from:http://www.ipmulticast.com/community/whitepapers/introrouting.html (pp. 1-11).
W. Fenner. Internet Group ManagementProtocol, Version 2 Internet Engineering Task Force (IETF) Request for Comments (RFC) 2236.(Nov. 1997) pp. 24.
Bussey, H. E. et al., "Service Architecture, Prototype Descriptions, and Network Implications of A Personalized Information Grazing Service", Jun. 1990, (Infocom) vol. 2.
Kohda, Y. et al., "Ubiquitous advertising on the WWW: Merging Advertisement on the Browser", Computer Networks and ISDN Systems, May 1996, vol. 28.

* cited by examiner

*Primary Examiner*—Gerald Gauthier

(57) ABSTRACT

Disclosed is a method of targeting a multi-cast message, comprising the steps of gathering user information related to one or more users, categorizing the user information into one or more interest categories, associating respective ones of the users with ones of the interest categories, receiving service information from a service provider, determining an association between the received service information and ones of the interest categories to determine at least one associated interest category, selecting users using the at least one associated interest category to determine selected users and communicating the received service information to the selected users using the multi-cast message.

24 Claims, 2 Drawing Sheets

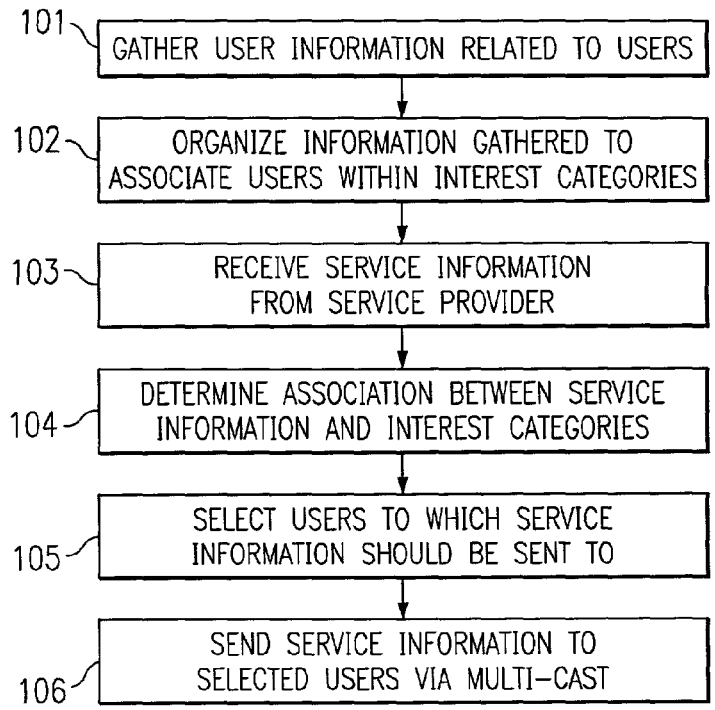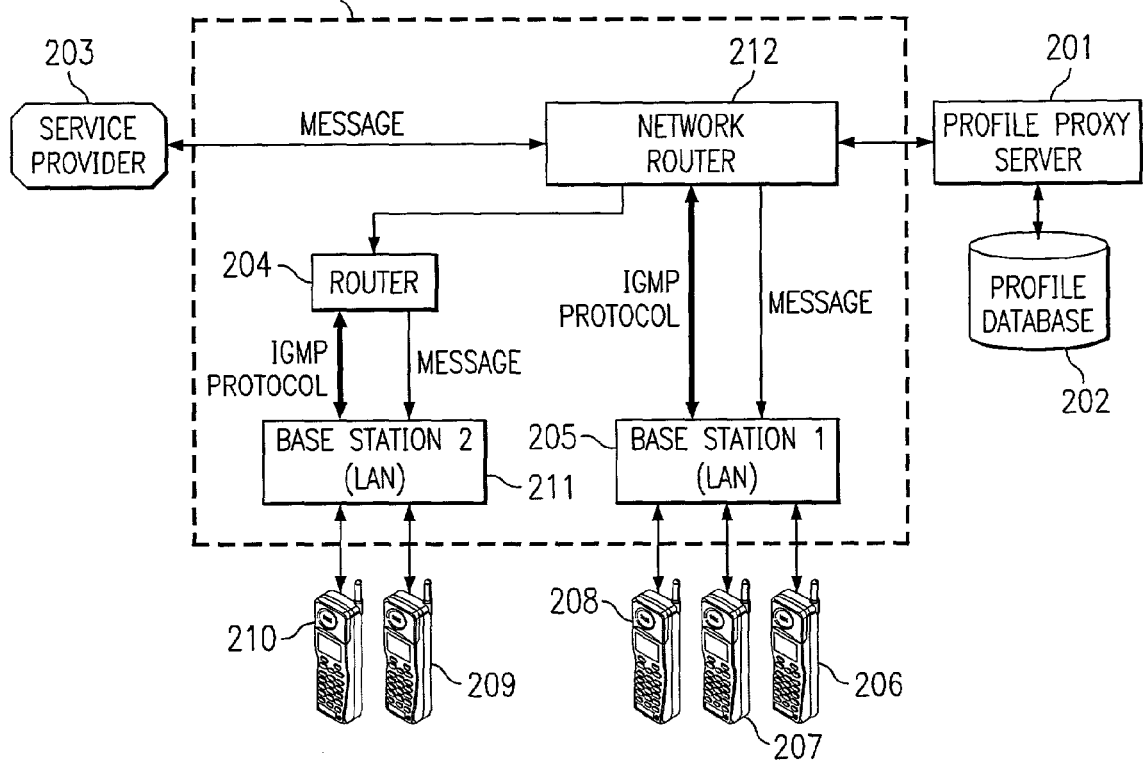

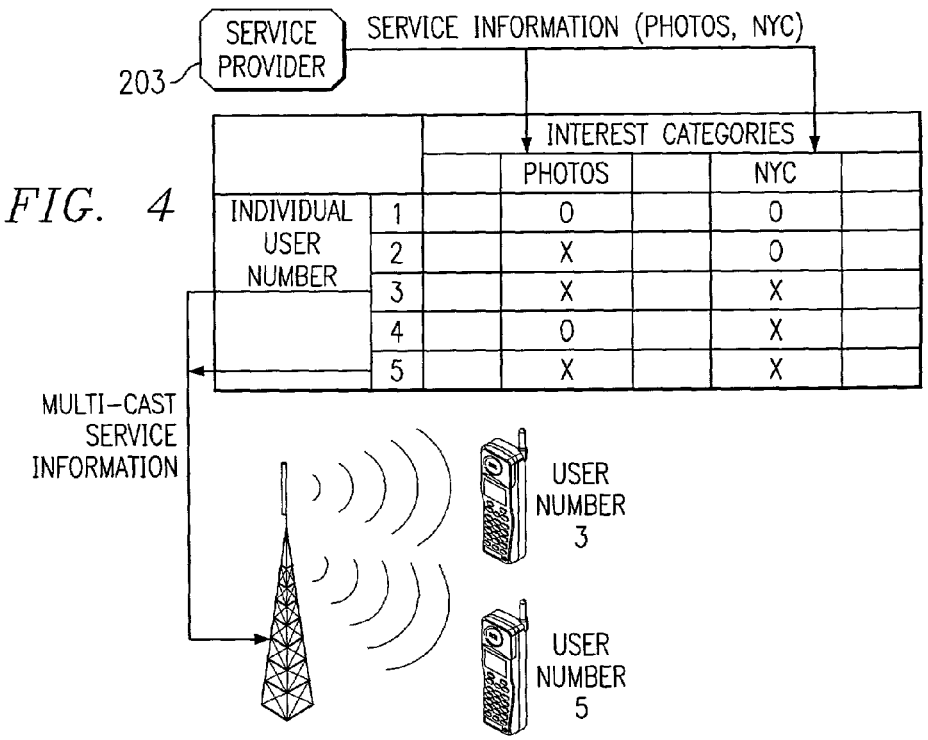

SYSTEM FOR AND METHOD FOR DISPATCHING SERVICE MESSAGES OVER A MULTICAST NETWORK

TECHNICAL FIELD

The present invention relates generally to the distribution of selected information over a network and more specifically to the distribution of information to selected individuals via multi-casting.

BACKGROUND OF THE INVENTION

Mobile information distribution systems are now widely used for business and personal applications. These systems allow mobile phone users to communicate with other mobile phones users, access Internet sites (e.g., online shopping and banking, ticket reservations or restaurant advice) and receive distributed messages (e.g., email or other short messages). With the explosive growth of these mobile systems, mobile systems have revolutionized the way businesses interact with their customers and with each other. This potential is evident in the rapid growth of mobile systems.

Today, some mobile systems provide limited messaging services. "Short Messaging Service" (SMS) is the transmission of short text messages to, and from, a mobile phone. Messages generally include a limited number of text characters and preclude images or graphics. To transmit a message to a mobile phone using SMS, a sender transmits a message to a mobile phone, using a Short Message Service Center (SMSC). The SMSC locates the mobile device and attempts a delivery by paging the mobile phone, and if the phone responds, the message is delivered. The SMSC may also receive a verification that the message was received by the mobile phone.

"I-mode™", available from NTT DoCoMo, is another approach taken by mobile system providers to deliver information to mobile phones. I-mode provides multimedia services to mobile phone users, access to information (e.g., stock tickers, weather, traffic information) and communication services to communicate with other users (e.g., e-mail or a real time communications, such as instant messenger). I-mode incorporates technology, such as JAVA technology, into mobile phones.

Some mobile systems provide recommendations to mobile phone users. These recommendation systems may make generic recommendations to the users by sending messages (e-mail or SMS) to the user's mobile phone. The recommendation systems may base recommendations on various static attributes (also known as personalized filters) established in advance by the mobile phone user. For example, a personalized filter may filter information based on various interest categories (e.g., boating, computers, sports), profile data (e.g., older male) or location information (e.g., eastern United States, Washington D.C.). Collaborative filtering (CF) systems are a specific type of recommendation system that may recommend items to a user based on the characteristics of other users.

Multi-casting, i.e., the sending information from a single point to a select group of recipients, may be used for distributing information to a number of users. Only those groups participating in a multi-casting session actually receive the traffic for that group's session. For example, a video conference including multiple users may involve multi-casting since the user originating video and audio distributes the information to the multiple users one time. Without multi-casting, the same information will be carried over the network multiple times.

With the continuing proliferation of mobile communications there is an ever increasing demand to support additional services without necessitating a concomitant addition of wireless infrastructure to transport the new massage traffic. Accordingly, there is a need for a system and method of providing additional services using existing facilities.

SUMMARY OF THE INVENTION

An embodiment of the present invention provides a method of targeting a multi-cast message, comprising the steps of gathering user information related to one or more users, categorizing the user information into one or more interest categories, associating respective ones of the users with ones of the interest categories, receiving service information from a service provider, determining an association between the received service information and ones of the interest categories to determine at least one associated interest category, selecting users using the at least one associated interest category to determine selected users, and communicating the received service information to the selected users using the multi-cast message.

Another embodiment of the present invention provides a system for multi-casting service information to selected users comprising a profile router including a storage device, and a communications network connected to the profile router, wherein the profile router receives service information from a service provider via the communications network, identifies recipients for the service information and multi-casts the service information to the identified recipients.

BRIEF DESCRIPTION OF THE DRAWINGS

FIG. 1 shows a flow chart representing a method according to one embodiment of the present invention, and FIG. 2 shows a block diagram of one embodiment of a system for the transmission of multi-cast messages to individuals selected through personalized filtering;

FIG. 3 shows a table depicting individual users and interest categories according to an embodiment of the present invention;

FIG. 4 shows a block diagram representing use of individual user and interest categories according to an embodiment of the present invention; and FIG. 5 shows a table depicting service providers and interest categories according to an embodiment of the present invention.

DETAILED DESCRIPTION

FIG. 1 shows a flow chart representing a method according to one embodiment of the present invention. In step 101 relevant information is gathered from the respective users, e.g. cellular phone subscribers and/or users of other mobile data terminal devices such as personal digital assistants (PDA) and the like. Here, relevant information is used to define information which may be used to selectively distribute information, such as recommendations, messages and/or other information relevant to the aforementioned users. This information may be gathered in a number of ways or in a combination of ways. For example, users may be sent a survey, questionnaire, or other device for eliciting their interests directly. The survey or questionnaire may be sent to users in hardcopy (paper form) or electronically via electronic mail (e-mail) over a communications network such as an internet or an internet such as the Internet. Alternatively, or in addition, user actions (e.g., web surfing habits, previous purchases, web searches, web page ratings or opinions, Internet research) may be tracked or analyzed to determine the interests of the respective user or, in the case of collaborative filtering, the interest of other related users. Note that the two methods may be combined to have a first set of interests initially identified by the user and the system may use new user actions (or other user actions) to validate or update the system for interest changes.

In step 102 the information gathered in step 101 is organized to determine interest categories and to create appropriate associations between users and interest categories. For example, if an interest category is photography, any user who has indicated their interest in photography may be included in this association. Additionally, a user who has not directly indicated their interest in photography may be included in this category nonetheless if the system has recognized that actions by the user indicate an interest in photography using, for example, some form of profiling available from marketing research firms. In such cases, the system may recommend that photography be included as an interest category for that user. Note that interest categories may be broad such as photography or narrow such as photographing insects. Other interest categories may be broader or narrower than these examples. Interest categories may include camera manufacturers, camera types, camera models, black and white photography or color photography, or similar classifications. Predefined categories may be incorporated, such as those used by Yellow Pages and similar business directories, or may be dynamically built, such as based on user input and interests. Also note that a user may be included in several interest categories based on the same behavior or stated interest. For example associating a user with a photography interest category, a color photography category and a insect photography category may each be based on an answered question from the completed survey from the individual and/or information gathered from their user actions.

It should be appreciated that information which may not directly reflect a user's interests may be used in associating categories with users or otherwise for providing information to users. For example, the location of the individual may be used as an interest category, or may otherwise be used to determine the information provided to a user. Mobile devices such as ON-STAR® systems, cellular telephones, and other mobile devices may have functionality enabling a determination of the location of the device. In some systems this feature is entitled the Home Location Registry (HLR). At periodic intervals (e.g. 1–2 seconds) the HLR identifies the location of the mobile unit, such as a cellular phone. More precise location information is expected using FCC required Automatic Location Identification (ALI) capabilities to be incorporated into cellular telephone systems. These systems using, for example, satellite-based Global Positioning System technology, will locate a user within 50 meters of their position. Thus, for example, if an individual has indicated an interest in Italian cuisine, and their present location as identified by their cellular telephone, is two blocks away from an Italian restaurant service provider who has requested that service information related to a lunch special be distributed, information on the lunch special may be sent to the user based on their location and their prior identification of an interest in Italian cuisine. Accordingly, it should be appreciated that particular categories may be used individually to identify information sent to users or may be combined to more accurately target the distribution of service information.

In step 103, service information is received from a service provider. A service provider may be, for example, any merchant, retailer, distributor, individual, company, firm, or other organization in possession of a message, advertisement, or information they wish to distribute to others. This service information may be sent in real time over a communications network such as the Internet or may be sent via other methods and is preferably stored in the system for later use. This information may also be transmitted via the telephone from the service provider and entered into the system by an individual directly into the profile proxy server 201 (FIG. 2). The service information may contain details on sale prices, lunch specials, product availability, special discounts, or any other information sent from a service provider to a user.

In step 104 an association between the received service information and the interest categories is determined. This association may be a one-to-one, a one-to-many, or a many-to-one association. A one-to-one association may be appropriate for an organization to send out a recall notice to prior purchasers of their product. In this case, there is no need for anyone outside of the "purchased product" interest group to receive the information. A one-to-many association may be appropriate for a retailer who would like to sell a product to as many individuals as possible. For example, a retailer that wishes to distribute information related to a sale on color film may want the information to be distributed to any user within a one half a mile radius, e.g., to anyone nearby who has indicated an interest category of photography or to anyone who has user activity related to color film (e.g., a user who purchased two roles of color film within the last seven days). A many-to-one association may be appropriate for a retailer who has information regarding a number of photography products they wish to distribute to anyone in the photography interest group.

The association between the service information and the interest category may be determined in a number of different methods. For example, a knowledgeable service provider may explicitly state the interest categories they wish their service information be distributed to. The interest categories may also be determined from the service information. Determining interest categories from the service information may be performed using natural language selection techniques or by searching the service information for key words or attributes. The interest categories may also be determined by the service provider which supplies the service information. Note that these examples of methods to determine association between the service information and the interest categories are given as examples and are not meant to limit the present invention.

In one embodiment of the present invention a table (shown in FIG. 3) is used to associate multiple users with interest categories. Additionally a table may be used to associate service providers or service information with interest categories (FIG. 5). This association between the service information and the interest categories may also be predefined. Alternatively, natural language processing may be used to convert the free text information included in the service information into the service classification or interest categories.

In step 105 the association between the service information and the interest categories may be used to determine which of the users receive the service information. For example if one thousand users are included in the current system and one hundred of these users are identified within the photography interest category, service information related to photography will only be sent to the 100 users who are included in the photography interest category. This step of selecting may be performed with a filter applied to service information and/or a personalized filter which includes individual characteristics of the users.

In step 106 the service information may be communicated to the selected users. Note that the service information itself, or related service information may be communicated to the selected users and that this communication may be sent via the Internet or any other communication network. A multi-cast message may be used to conserve messaging resources when an identical message is sent to a number of individuals, such as in the one-to-many association. Suitable multi-cast systems are described in, for example, U.S. Pat. No. 5,887,252 to Noneman entitled "Multi-cast Transmission for DS-CDMA Cellular Telephones" and U.S. Pat. No. 6,104,709 to Rinchiuso et al. entitled "Channel Assignment Within A Broad-Band Communication System," both of which are incorporated herein in their entirety.

In one embodiment of the present invention, the identities of the users are protected by identifying individuals by numbers or other unique, non-identifying representations. For example, each user may be randomly assigned a unique ten-digit number which is associated with their interest categories and a method to communicate service information to them. Note that in this embodiment a mapping or pairing would be made correlating the unique non-identifying representation with, for instance, the IP address of the user.

In one embodiment, the present invention may be used for advertising. Random numbers may be assigned to each of the users and initial associations with interest categories may be determined based on responses to surveys sent to the users. Additional user actions may be used to update the initial associations and maintain a "best-available" association between users and interest categories. Interest categories may be dynamically created, updated, and discarded based on the characteristics and preferences of the users and/or the underlying subject matter. For example, an interest category may be created and associated with an over-the-counter drug when it is first available on the market and discarded or deleted when the drug is removed from the market.

A user may be associated with a number of interest categories. A first user may be associated with photography, exercise, running, weight-reduction, muscle building, and video games interest groups. The first user may also be located in District of Columbia. A second user may be associated with photography, professional football, Olympic winter games, figure skating, and raising children interest groups and may be located in Atlanta, Ga. A service provider selling exercise equipment nationwide may, using the present invention, send service information to the first user but not to the second user. Similarly, a second service provider selling tickets to the Olympic Winter Games may, using, the present invention, send service information to the second user and not to the first user. However, a third service provider of discounted photographic equipment may send service information to both the first user and the second user using the present invention. Alternatively, a fourth service provider offering reduced prices on photographic equipment in the District of Columbia may only send the service information to the first user located in the District.

FIG. 2 is a block diagram of one embodiment of a system for the transmission of multi-cast messages to users selected through filtering. This embodiment includes an architecture that uses a standard multi-cast network to deliver electronic service notifications to multiple devices. Services are broadcast according to this embodiment via multi-cast over a wireless network. As earlier described, users may receive service information based, at least in part, on their location. For example, users or devices which are within range of a particular base station may receive service information or messages based on their proximity to the base station. This may be accomplished by a "location" interest category.

The embodiment of FIG. 2 shows a system for multi-casting service information to selected users comprising profile proxy server 201 and a communications network 213. Note that while FIG. 2 includes a profile proxy server 201, a profile router or any other equipment used to associate the interest categories with users and/or service provider is also preferably included according to the present invention. Profile Proxy server 201 preferably includes a personal profiling engine or processor which takes user data and builds a custom profile related to the preferences of the user. The personal profiling engine may also include a natural language processing capability which creates associations between the service information and the interest categories. Profile proxy server 201 of the illustrated embodiment includes a storage device shown as profile database 202.

Communications network 213 may comprise an internet, an internet such as the Internet, a public switched telephone network (PSTN), a wireless network such as a cellular or personal communications system (PCS) network or any other network or other transmission media, or combinations thereof, capable of providing communication between profile proxy server 201 and service provider 203. Additionally, communications network 213 may comprise any of the above mentioned networks or other transmission media, or combinations thereof, capable of providing communication between profile proxy server 201 and users on cell phones or other wireless devices 206, 207, 208, 209, and 210. It shall be appreciated, however, that separate networks may be utilized in providing communication between profile proxy 201 and one or more service providers 203 and/or between profile proxy server 201 and one or more user devices 206–210.

Service providers such as service provider 203 typically have their own IP address and port by which they may be identified. A proxy server preferably acts as an intermediary between a client and a service such as a service provider on the world wide web.

Profile proxy server 201 preferably receives service information from service provider 203 via communications network 213. Profile proxy server 201 also preferably selectively multi-casts the service information to one or more users' cell phones 206–210 via communications network 213. For example, Internet Group Management Protocol (IGMP) as described in the Internet Engineering Task Force (IETF) Request for Comments (RFC) 2236 may be used to implement multicasting by an IP host such as profile proxy server 201. Note that some cellular phones, such as one or more of user's cell phones 206–210, may be configured to access and navigate the world wide web.

Communications network 213 of the illustrated embodiment include a standard router 204, network router 212, base station 205 and cellular base station 211. Routers 212 and 204 preferably forward information, such as electronic mail or text messages to the provided addresses and may divide the information into individual packets to accomplish transmission of the information. Base stations 205 and 211 preferably allow the land lines such as the Internet to communicate with mobile devices, such as wireless Personal Digital Assistants (PDAs) and cellular phones.

Profile proxy server 201 may include an association between the users and the interest categories. The interest categories may be based on inputs received directly from the users or indirectly from information gathered from user actions. Profile proxy server 201 may also include a central processing unit which is configured to determine associations between service information received from service provider 203 and the interest categories. This association may also be accomplished through the use of a tabular format residing on profile proxy server 201 or profile database 202.

Note that profiles are preferably associated with the users of cellular phones 206–210. These profiles may identify the interest categories and location of users associated with the cellular phones 206–210. The profile information may be stored within profile proxy server 201 or profile database 202. While a single profile proxy server is shown, the described functionality may be resident on a single server or divided among numerous cooperating servers to accomplish the described activity. Note also that other forms of wireless devices may be used in the present invention in addition to, or in place, of cellular phones, e.g., two-way pagers, PDA's, etc.

Another embodiment of the present invention may use electronic services notification which are multi-cast to certain networks via a registration process which requires at least one user or client in the local network to request or otherwise qualify for the service notification. For example, if a service provider (a retailer) wished to send service information concerning pottery to users within a one mile range, and there were no users or clients within the defined distance, the multi-cast message would not be transmitted.

FIG. 3 depicts a preferred embodiment table used to determine which individual users will receive service information associate with particular interest categories. Each individual user is preferably assigned a unique number (e.g., 1, 2, 3) or other identifier in column 301. A plurality of interest categories are also preferably included in the table (e.g., photography, boating, Italian food, running) in row 302. An "X" in the table indicates an association such as inclusion of the individual in the interest category. An "O" indicates that the individual is not included or associated with the interest category. For example, user "1" is interested in photography and boating but not Italian food or running. User "1" will therefore receive information only related to photography and boating according to a preferred embodiment of the invention. Note that FIG. 3 is used for purposes of illustration only and is not intended to limit the present invention. The present invention includes associations between users and interest categories in any form.

FIG. 4 depicts a block diagram of one embodiment of the present invention. Service provider 203 transmits service information to the proxy profile server 201 (FIG. 2). The service information is meant, for example, for users interested in "photography" in the "New York City" location (e.g., a user who has selected an interest category relating to "photography" and "New York City"). Based on the interest categories and users, users "3" and "5" will receive the service information. The users may be selected by using a filter applied to service information or a personalized filter which includes individual characteristics of the users. The service information may be communicated to user "3" and "5" by sending a multi-cast message to those users and a wireless communication network. Note also that while FIG. 4 depicts a table with five users and two interest categories, the present invention includes any number of users, any number of interest categories and any number of associations between users and interest categories.

FIG. 5 depicts a preferred embodiment table associating service providers with interest categories. A similar table can be constructed associating service information with interest categories. Each service provider in column 501 has an associated row which indicates the absence or presence of affiliations with interest categories. Row 502 shows example interest categories associated with the service providers.

What is claimed is:

1. A method of targeting a multi-cast message, comprising the steps of:
   gathering user information related to one or more users;
   creating one or more interest categories by organizing the user information;
   categorizing the user information into the one or more interest categories;
   associating respective ones of said users with ones of said interest categories;
   receiving service information from a service provider;
   determining an association between the received service information and ones of said interest categories to determine at least one associated interest category;
   selecting users using said at least one associated interest category to determine selected users; and
   communicating said received service information to said selected users using said multi-cast message.

2. The method of claim 1, wherein said step of gathering user information includes gathering information provided directly by said users.

3. The method of claim 1, wherein said step of gathering user information includes gathering information from transactions performed by said user.

4. The method of claim 1, wherein said step of associating includes a step of accessing stored information.

5. The method of claim 1, wherein, said step of receiving service information from said service provider includes receiving said service information via an internet.

6. The method of claim 1, wherein said step of determining an association includes a step of selecting interest groups associated with respective ones of said service provider.

7. The method of claim 1, wherein said step of selecting users includes applying a personalized filter.

8. The method of claim 1, further comprising the step of protecting an identity of said one or more users by indirectly associating said user information with said one or more users.

9. A system for multi-casting service information to selected users comprising:
   a profile server including a storage device; and
   a communications network connected to said profile server; wherein said profile server receives service information from a service provider via said communications network,
   said profile server identifies recipients for said service information by
       determining association between the received service information and interest categories associated with the recipients, and by
       selecting said recipients using the associated interest categories and a current location of each of said recipients and
   said profile server transmits said service information to said identified recipients via multi-cast.

10. The system of claim 9 further including:
a base station connected to said communications network for communicating with a mobile device receiving said multicast of said service information.

11. The system of claim 9 wherein said storage device includes a database.

12. The system of claim 9, wherein said profile server further includes:
a memory storing an association between ones of said users and interest categories.

13. The system of claim 12 wherein said interest categories are identified based on information directly received from said users.

14. The system of claim 12 wherein said interest categories are dynamically identified based on transactions performed by said users.

15. The system of claim 9 further including:
a memory storing an association between said service information and one or more interest categories.

16. The system of claim 9 including a memory association said interest categories with one or more of said users.

17. Computer readable code stored on computer-readable media for selecting recipients and sending multi-cast messages, comprising:
a first subprocess for gathering user information related to one or more users;
a subprocess for creating one or more interest categories by organizing the user information, wherein the user information comprises information directly received from the one or more users and gathered actions of the one or more users indicative of interests of the one or more users;
a second subprocess for categorizing user information into the one or mare interest categories;
a third subprocess for associating respective ones of said users with ones of said interest categories;
a fourth subprocess for receiving service information from a service provider;
a fifth subprocess for determining an association between the received service information and ones of said interest categories to determine at least one associated interest category;
a sixth subprocess for selecting users using said at least one associated interest category and a current location of each of the users to determine selected users; and
a seventh subprocess for communicating said received service information to said selected users using said multi-cast message.

18. The computer readable code stored on computer readable media of claim 17, wherein said first subprocess includes information provided directly by said users.

19. The computer readable code stored on computer readable media of claim 17, wherein said first subprocess includes information derived from transactions performed by said user.

20. The computer readable code stored on computer readable media of claim 17, wherein said third subprocess includes accessing information stored in a table.

21. The method of claim 1, wherein associating respective ones of said users with ones of said interest categories further comprises:
determining a current location of a user of said users; and
associating an interest category of said interest categories with said user using said current location of said user.

22. The method of claim 1, wherein selecting users using said at least one associated interest category to determine selected users further comprises:
determining a current location of a user of said users; and
selecting said user using the at least one associated interest category and said current location of said user.

23. The method of claim 1, wherein associating respective ones of said users with ones of said interest categories further comprises:
receiving information directly from said users identifying interests of the users;
gathering other information for actions performed by the users, wherein the other information is indicative of the interests of the users; and
associating the respective ones of said users with the ones of said interest categories based on the information received directly from said users and the other information.

24. The method of claim 1, wherein the user information comprises user information received directly from the users and gathered other information for actions performed by the users, wherein the other information is indicative of the interests of the users.

* * * * *

UNITED STATES PATENT AND TRADEMARK OFFICE
CERTIFICATE OF CORRECTION

| | | |
|---|---|---|
| PATENT NO. | : 7,133,502 B2 | Page 1 of 1 |
| APPLICATION NO. | : 10/061467 | |
| DATED | : November 7, 2006 | |
| INVENTOR(S) | : Hans J. Wolters et al. | |

It is certified that error appears in the above-identified patent and that said Letters Patent is hereby corrected as shown below:

On the Title page, in field (73), in "Assignee", in column 1, line 2, delete "LP.," and insert -- L.P., --, therefor.

In column 3, line 2, after "such as an" delete "internet" and insert -- intranet --, therefor.

In column 6, line 26, delete "internet," and insert -- intranet, --, therefor.

In column 8, line 38, in Claim 5, delete "wherein," and insert -- wherein --, therefor.

In column 8, line 60, in Claim 9, after "determining" insert -- an --.

In column 9, line 34, in Claim 17, delete "mare" and insert -- more --, therefor.

Signed and Sealed this

Eighth Day of December, 2009

David J. Kappos
*Director of the United States Patent and Trademark Office*